(12) United States Patent
Libinson

(10) Patent No.: US 12,441,062 B2
(45) Date of Patent: Oct. 14, 2025

(54) SYSTEM AND METHOD FOR WASTE MANAGEMENT IN AN ADDITIVE MANUFACTURING PROCESS

(71) Applicant: Stratasys Ltd., Rehovot (IL)

(72) Inventor: Alexander Libinson, Holon (IL)

(73) Assignee: Stratasys Ltd., Rehovot (IL)

( * ) Notice: Subject to any disclaimer, the term of this patent is extended or adjusted under 35 U.S.C. 154(b) by 466 days.

(21) Appl. No.: 17/785,430

(22) PCT Filed: Dec. 15, 2020

(86) PCT No.: PCT/IL2020/051292
§ 371 (c)(1),
(2) Date: Jun. 15, 2022

(87) PCT Pub. No.: WO2021/124325
PCT Pub. Date: Jun. 24, 2021

(65) Prior Publication Data
US 2023/0040936 A1 Feb. 9, 2023

Related U.S. Application Data

(60) Provisional application No. 62/948,352, filed on Dec. 16, 2019.

(51) Int. Cl.
*B29C 64/35* (2017.01)
*B29C 64/209* (2017.01)
(Continued)

(52) U.S. Cl.
CPC ............ *B29C 64/35* (2017.08); *B29C 64/209* (2017.08); *B29C 64/245* (2017.08); *B33Y 40/00* (2014.12)

(58) Field of Classification Search
CPC ....... B29C 64/20; B29C 64/35; B29C 64/209; B29C 64/245; B29C 64/364; Y02W 30/62; B33Y 30/00; B33Y 40/00
See application file for complete search history.

(56) References Cited

U.S. PATENT DOCUMENTS 3,836,987 A * 9/1974 Gibbons .................. G03D 7/00
396/564
8,450,701 B2 5/2013 Reynolds et al.
(Continued)

FOREIGN PATENT DOCUMENTS

| JP | 2018-520919 | 8/2018 |
|----|-------------|--------|
| WO | WO 2017/009833 | 1/2017 |
| WO | WO 2021/124325 | 6/2021 |

OTHER PUBLICATIONS

Communication Pursuant to Article 94(3) EPC Dated Jun. 28, 2024 From the European Patent Office Re. Application No. 20829995.8. (3 Pages).
(Continued)

*Primary Examiner* — Jerzi H Moreno Hernandez

(57) ABSTRACT

A waste management system for an AM device includes a waste container, an air cleaning device installed within an enclosure of the AM device, a first conduit and at least one second conduit. The air cleaning device condense vapors formed within an enclosure of the AM device during operation of the AM device. The first conduit directs the condensed vapors in a liquid state from the air cleaning device to the waste container and the at least one second conduit directs waste accumulated during operation of the AM device to the waste container. The waste container stores waste accumulated by the AM device during operation of the AM device.

16 Claims, 4 Drawing Sheets

(51) Int. Cl.
B29C 64/245 (2017.01)
B33Y 40/00 (2020.01)

(56) References Cited

U.S. PATENT DOCUMENTS

| | | | |
|---|---|---|---|
| 2003/0063138 A1 | 4/2003 | Varnon et al. | |
| 2003/0179260 A1* | 9/2003 | Anderson | B41J 2/17 347/34 |
| 2003/0235635 A1* | 12/2003 | Fong | B29C 64/364 55/385.2 |
| 2009/0176032 A1 | 7/2009 | Kritchman et al. | |
| 2009/0321972 A1* | 12/2009 | Zinniel | B33Y 40/20 425/445 |
| 2010/0191360 A1 | 7/2010 | Napadensky et al. | |
| 2017/0173886 A1 | 6/2017 | Menchik et al. | |
| 2017/0232552 A1 | 8/2017 | Crear et al. | |
| 2018/0154437 A1 | 6/2018 | Mark | |
| 2018/0201021 A1* | 7/2018 | Beaver | B29C 64/35 |
| 2018/0221950 A1* | 8/2018 | Mark | B22F 10/16 |
| 2018/0264731 A1 | 9/2018 | Kritchman | |
| 2019/0076924 A1* | 3/2019 | Jepeal | B29C 64/357 |

OTHER PUBLICATIONS

International Preliminary Report on Patentability Dated Jun. 30, 2022 From the International Bureau of WIPO Re. Application No. PCT/IL2020/051292. (11 Pages).

International Search Report and the Written Opinion Dated Mar. 29, 2021 From the International Searching Authority Re. Application No. PCT/IL2020/051292. (15 pages).

Notice of Reasons for Rejection Dated Sep. 27, 2024 From the Japan Patent Office Re. Application No. 2021-578118 and its Translation Into English. (12 Pages).

Office Action Dated Oct. 27, 2024 From the Israel Patent Office Re. Application No. 293903. (3 Pages).

* cited by examiner

SYSTEM AND METHOD FOR WASTE MANAGEMENT IN AN ADDITIVE MANUFACTURING PROCESS

RELATED APPLICATIONS

This application is a National Phase of PCT Patent Application No. PCT/IL2020/051292 having International filing date of Dec. 15, 2020, which claims the benefit of priority under 35 USC § 119 (e) of U.S. Provisional Patent Application No. 62/948,352 filed on Dec. 16, 2019. The contents of the above applications are all incorporated by reference as if fully set forth herein in their entirety.

FIELD AND BACKGROUND OF THE INVENTION

The present invention, in some embodiments thereof, relates to Additive Manufacturing (AM) and, more particularly, but not exclusively, to a system and method for waste management of byproducts generated therefrom.

AM describes a group of technologies in which a three-dimensional (3D) object is fabricated from a computer model of the object without part-specific tooling or human intervention, for example a freeform fabrication process in which the three-dimensional object is fabricated by deposition of successive layers of building material.

Some AM devices selectively deposit i.e. dispense building material in liquid form via one or more printing heads and then solidify the material to define the shape of the object. The liquid may be, for example, a photocurable liquid, e.g., a photopolymerizable formulation deposited at elevated temperatures and polymerized and/or solidified through exposure to radiation, such as ultraviolet (UV) radiation. Such a device may produce waste material over the layer building process for example when removing a portion of building material deposited in a layer prior to solidifying the layer, to level the layer or modify its thickness. Liquid waste may additionally be collected in a purging station of the device to discharge building material from printing heads when replacing the building material in the printing heads, to clean the printing heads and to prevent any clogging in the nozzles of the printing heads by occasionally spitting out building material over a waste bath in the purging station. When the waste is a photocurable liquid, the active volatile components may be required to be treated to neutralize the active components before discarding the waste.

U.S. Pat. No. 7,919,152 entitled "Method and apparatus for curing waste containing photopolymeric components," describes a method of curing waste material containing photopolymeric components. When cured, the solid material formed includes only a low content of photoactive components, and therefore may be discarded as common trash.

Fabrication with photopolymerizable building material is typically performed at elevated temperatures. The elevated temperatures promote release of a significant amount of active volatile components from the photopolymerizable material in an internal space of the AM device. Air from the internal space of the AM device is typically filtered prior to being expelled to the surrounding area, e.g. out of the enclosed space of the AM device. Carbon filtering is known to be used to trap airborne components released in the AM device's enclosure and thereby avoid contaminating the surrounding air external to the enclosure. The carbon filters require periodic replacement to maintain their effectiveness. The used filters may require specialized treatment for waste management.

SUMMARY OF THE INVENTION

According to an aspect of some example embodiments, there is provided a system and method for managing both liquid and airborne waste, e.g. vaporized contaminants that accumulate during an AM process that includes depositing photopolymerizable material. The system and method described herein may provide for reducing or optionally eliminating the need to rely on carbon filtering. Optionally, when carbon filtering is used, the frequency at which a carbon filter is required to be replaced may be reduced. Reducing the frequency at which a carbon filter is required to be replaced reduces costs associated with replacing the carbon filter, waste treating the used carbon filter, as well as costs associated with halting operation of the AM device during the replacement.

According to an aspect of some example embodiments, the collection of airborne waste accumulated during an AM process is based on condensing vapors in the air to form a liquid condensation and combining the collected liquid condensation with other accumulated waste. The condensed airborne waste and collected waste may be waste treated by a common waste treatment process. Optionally, the combined condensed airborne waste and collected waste is cured to reduce concentration of photoactive components within the combined waste. Optionally based on the curing, the waste may be discarded as common trash.

According to an aspect of some example embodiments, there is provided a waste management system for an AM device, the system comprising: a waste container configured to store waste accumulated by the AM device during operation of the AM device; an air cleaning device installed within an enclosure of the AM device and configured to condense vapors formed within an enclosure of the AM device during operation of the AM device; a first conduit configured to direct the condensed vapors in a liquid state from the air cleaning device to the waste container; and at least one second conduit configured to direct waste accumulated during operation of the AM device to the waste container.

Optionally, the system includes an air circulation pump configured to actively direct a flow of air within the enclosure of the AM device to the air cleaning device.

Optionally, the air cleaning device is a cold trap filter.

Optionally, the air cleaning device is configured to operate at temperatures 5° C. to −60° C.

Optionally, the air cleaning device is selected to reduce a concentration of monomers in the air enclosed within the enclosure based on condensing the vapors.

Optionally, the air cleaning device is selected to condense vapors including one or more of Acryloylmorpholine and Isobornyl acrylate.

Optionally, the air cleaning device includes an air outlet through which cleaned air is expelled and wherein the air outlet is configured to direct air through an outlet on the enclosure of the AM device.

Optionally, the system includes at least one carbon filter installed on the outlet in the enclosure of the AM device and wherein the clean air is configured to be expelled through the carbon filter.

Optionally, the system includes a waste treatment apparatus configured to neutralize active components in the waste contained in the waste container.

Optionally, the waste treatment apparatus includes a radiation source configured to radiate the waste and thereby neutralize photoactive components in the waste.

Optionally, the waste treatment apparatus includes: a rotatable platform configured to support the waste container; and a motor configured to rotate the platform.

Optionally, the waste treatment apparatus includes a water source configured to controllably direct water into the waste container.

Optionally, the system includes at least one pump configured to controllably pump waste from the at least one second conduit into the waste container.

Optionally, the at least one second conduit is configured to direct waste from a leveling device of the AM device to the waste container.

Optionally, the at least one second conduit is configured to direct waste from a purging station of the AM device to the waste container.

According to an aspect of some example embodiments, there is provided an AM device comprising: a tray configured to receive building material in a layer-wise manner; an inkjet printing block comprising: at least one printing head configured to selectively dispense building material on the tray in a layer-wise manner, wherein the selective dispensing defines an object to be built; a leveling device configured to remove surplus material from a layer dispensed with the at least one printing head; and a waste management system as described herein above.

Optionally, the device includes a purging station configured to perform maintenance operations on the inkjet printing heads, wherein the at least one second conduit of the waste management system is configured to direct waste from a purging station to the waste container.

According to an aspect of some example embodiments, there is provided a method to manage waste produced within an enclosure of an AM device and during its operation, the method comprising: actively condensing vapors in air enclosed within the enclosure into liquid condensation with an air cleansing device; and directing the liquid condensation to a waste chamber, wherein the waste chamber is also configured to receive waste accumulated during operation of the AM device, the waste including surplus building material.

Optionally, the method includes pumping air in the enclosure toward the air cleaning device.

Optionally, the method includes expelling air cleaned with the air cleaning device out of the enclosure.

Optionally, the method includes filtering the air expelled out of the enclosure with a carbon filter.

Optionally, the air cleaning device is a cold trap filter.

Optionally, the air cleaning device is configured to operate at temperatures 5° C. to −60° C.

Optionally, the air cleaning device is selected to reduce a concentration of monomers in the air enclosed within the enclosure based on condensing the vapors.

Optionally, the air cleaning device is selected to condense vapors including one or more of Acryloylmorpholine and Isobornyl acrylate.

Optionally, the method includes treating the waste collected in the waste chamber, wherein the treating includes neutralizing active components in the liquid.

Optionally, the method includes radiating the waste, wherein the radiating is configured to neutralize photoactive components in the waste.

Optionally, the method includes rotating the waste container over a duration of the radiating Optionally, the waste treatment apparatus includes a water source configured to controllably direct water into the waste container.

Optionally, the method includes controllably pumping the waste into the waste container.

Optionally, the waste accumulated during operation of the AM device is accumulated with a leveling device configured to remove surplus building material from layers of an object being built, wherein the leveling device is included in the AM device.

Optionally, the waste is accumulated in a purging station of the AM device, the purging station configured to perform maintenance on a printing head of the AM device.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
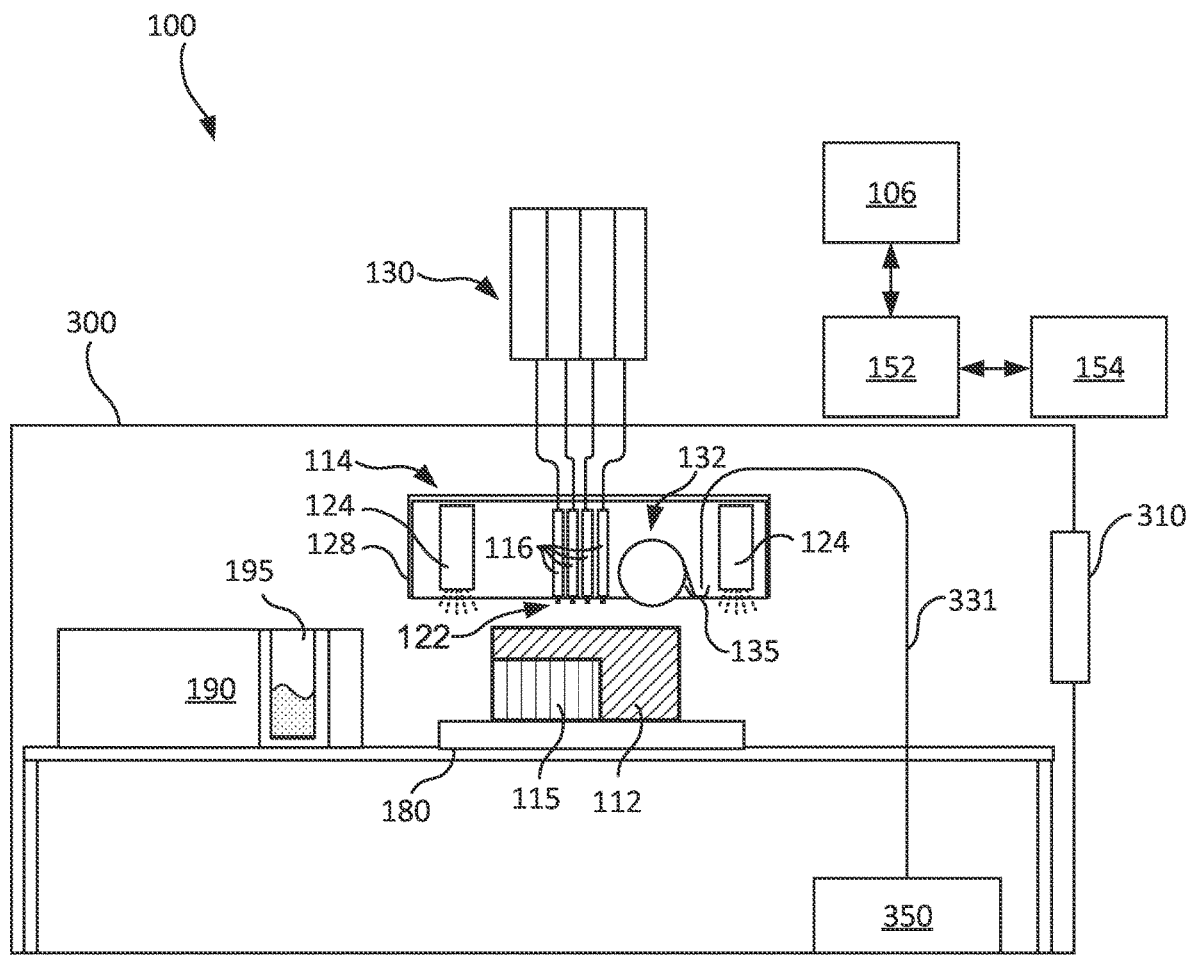
FIG. 1 is a simplified block diagram of an example AM device for three-dimensional printing for use with some example embodiments.

The present invention, in some embodiments thereof, relates to additive manufacturing and, more particularly, but not exclusively, to a system and method for waste management of byproducts obtained therefrom.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

According to some example embodiments, an AM device includes a waste management system that is configured to collect both waste material accumulated during the AM printing process as well as airborne waste produced by the AM device and channel the waste into a waste container. Optionally, the waste collected in the waste container may be treated to neutralize active components, e.g. photoactive components in the waste. According to some example embodiments, the waste management system includes a cold trap filter configured to extract volatile substances and liquid vapors expelled in the internal space of the AM device during fabrication and condense the extracted material to a liquid state. Optionally, volatile substances are monomers and the cold trap filter is configured to trap the monomers and thereby reduce their concentration in the air. In some example embodiments, effectiveness of the cold trap filter may be defined by its selected operational temperature. Optionally, the cold trap filter is selected to operate at a temperature of 5° C. to −60° C. depending on system requirements. The cold trap filter may be an off-the-shelf product or alternatively may be adapted for use with an AM device. Example off-the-shelf cold filters that may be suitable include for example CT-50G Cold Trap/Vacuum Vapor Trap CT/VT manufactured by OPERON in Gyeonggi-do, Korea. Optionally, the small glass type/stick type filter may be suitable.

According to some example embodiments, the condensed extracted material is directed to a waste container of the AM device. Optionally, the same waste container is also configured for collecting waste accumulated during the AM fabrication process. Example sources of waste includes waste accumulated when leveling layers to remove excess or surplus material, when replacing building material and/or when cleaning printing heads. Optionally, the collected waste may include some solid or at least partially solid particles immersed in liquid. As used herein liquid waste includes any waste product that is flowable. According to some example embodiments, curing is applied to the material collected in the waste container to neutralize photoactive components in the waste.

Optionally, air flow through the cold trap filter is expelled from an internal space of the AM device. Optionally, the filtered air is expelled through an additional air filter, e.g. a carbon filter. In some example embodiments, an air circulation pump directs air from an internal space of the AM device into the cold trap filter to promote active filtering.

In preferred embodiments of the present invention the AM comprises three-dimensional printing, more preferably three-dimensional inkjet printing. In these embodiments a building material formulation is dispensed from a printing head having an array of nozzles to deposit building material formulation/s in layers on a tray. The AM apparatus thus dispenses building material formulation/s in target locations which are to be occupied and leaves other target locations void. The apparatus typically includes a plurality of printing heads, each of which can be configured to dispense a different building material formulation. The building material dispensed by a printing head may be replaced over the building process as needed. Thus, different target locations can be occupied by different building material formulations. The types of building material formulations can be categorized into two major categories: modeling material formulation and support material formulation. The support material formulation serves as a supporting construction or as a supporting matrix for supporting the object or object parts during the fabrication process and/or other purposes, e.g., allowing fabrication of hollow or porous objects. Support constructions may additionally include modeling material formulation elements, e.g. for further support strength.

The modeling material formulation is generally a composition which is formulated for use in AM and which is able to form a three-dimensional object on its own, i.e., without having to be mixed or combined with any other substance.

The final three-dimensional object is made of the modeling material formulation or a combination of modeling material formulations or modeling and support material formulations or modification thereof (e.g., following curing). All these operations are well-known to those skilled in the art of Additive Manufacturing.

In some exemplary embodiments of the invention an object is manufactured by dispensing two or more different modeling material formulations, each material formulation from a different printing head or different array of printing head nozzles of the AM. The material formulations are optionally and preferably deposited in layers during the same pass and/or subsequent passes of the printing heads relative to the printing surface. The material formulations and combination of material formulations within the layer are selected according to the desired properties of the final 3D object.

For purposes of better understanding of some embodiments of the present invention, as illustrated in FIGS. 2-5 of the drawings, reference is first made to the construction and operation of an AM device for three-dimensional printing as illustrated in FIG. 1.

A representative and non-limiting example of an AM device 100 suitable for AM of an object 112 according to some embodiments of the present invention is illustrated in FIG. 1. AM device 100 may include inkjet printing block 114 having a plurality of printing heads 116. Each head preferably includes an array of nozzles 122 through which a liquid building material is dispensed via inkjet technology. Single channel and/or multiple channels printing heads may be contemplated. Optionally and preferably a building material supply apparatus 130 contains the building material containers or cartridges and supplies a plurality of building material formulations to printing heads 116 during printing. Each printing head 116 may be designated for dispensing one or more types of model material for forming object 112 and may also be designated for dispensing one or more types of support material for forming supporting structure 115 for object 112. Optionally, one printing head 116 may dispense a first building material formulation via a first set of nozzles in array 122 and a second building material formulation via a second set of nozzles in array 122. Although, in the representative example of FIG. 1, four printing heads 116 are illustrated, it is contemplated that inkjet printing block 114 may optionally include more or less printing heads 116.

Inkjet printing block 114 may also include a solidification device 124, e.g. hardening device, configured to emit light, heat or the like and optionally and preferably harden thereby one or more of the modeling material and the support material. For example, solidification device 124 may include an ultraviolet (UV) lamp, an infrared (IR) lamp and/or a light emitting diode (LED) lamp to cure or otherwise solidify the modeling material and optionally the support material. In some exemplary embodiments, inkjet printing block 114 further includes a leveling device 132. Leveling device 132 may include a roller that removes surplus material, a blade that scraps the surplus material from the roller and a trough 135 to collect the surplus material removed with the blade. Leveling device 132 may be configured to straighten, flatten and/or establish a pre-defined layer thickness of a current layer prior to solidifying the current layer and/or deposition of a subsequent layer. Surplus building material collected by leveling device 132 may be channeled through a conduit 331 into a waste container 350. Optionally conduit 331 includes flexible tubing that can be moved together with block frame 128.

Printing heads 116, solidification device 124 and leveling device 132 may be mounted in a block frame 128 of inkjet printing block 114 which is preferably operative to reciprocally move over a tray 180, which serves as the working surface. In some embodiments, solidification device 124 and leveling devices 132 are mounted in block frame 128 such that they follow in the wake of printing heads 116 to at least partially solidify (e.g., cure) the materials just dispensed by the printing heads. Optionally, tray 180 is configured to move in one or more directions in which block frame 128 is stationary. Solidification device 124 may harden or partially harden a current layer prior to forming the successive layer thereon. Leveling device 132 may level a layer prior to its solidification with solidification device 124. Inkjet printing block 114 is preferably operated within an enclosure 300. Enclosure 300 may include one or more air filters 310, e.g. carbon filters to collect volatile substances that may be vaporized during the fabrication process and thereby prevent contamination of the surrounding environment. Building material supply apparatus 130 may be external to enclosure 300, may be stored in a separate enclosure or alternatively may be included within enclosure 300.

AM device 100 may also include a maintenance or purging station 190 that is periodically accessed by inkjet printing block 114 during a fabrication process and/or during a dedicated maintenance session. While inkjet printing block 114 is positioned over purging station 190, material in one or more printing heads 116 may be discharged into purging station 190 for example before replacing material in printing heads 116, for cleaning printing heads 116 with cleaning fluid, and/or actively discharging material from printing heads 116 to avoid or open clogged nozzles. Purging station 190 includes a bath 195 to collect material dispensed from printing heads 116 as well as cleaning fluid used. Waste collected in bath 195 may be pumped to a central waste container for collection or waste treatment.

A computerized controller 152 controls fabrication with inkjet printing block 114 and optionally and preferably also controls supply apparatus 130. Controller 152 typically includes one or more electronic circuits configured to perform the controlling operations. Controller 152 preferably communicates with a data processor 154 which transmits digital data pertaining to fabrication instructions based on computer object data, e.g., a CAD configuration represented on a computer readable medium in any known format, including, without limitation, a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD).

Typically, controller 152 controls the voltage applied to each printing head or nozzle array and the temperature of the building material being dispensed by the respective printing head.

Once the data is loaded to controller 152 it can operate without user intervention. In some embodiments, controller 152 receives additional input from the operator, e.g., using data processor 154 or using a user interface 106, e.g. a display with a keyboard, a touch screen and the like, communicating with controller 152. For example, controller 152 can receive, as additional input, one or more building material types and/or attributes, such as, but not limited to, color, characteristic distortion and/or transition temperature, viscosity, electrical property, magnetic property, and/or mechanical properties. Other attributes and groups of attributes are also contemplated. It is noted that controller 152 and data processor 154 are shown schematically as separated blocks external from enclosure 300 for simplification purposes. Each of controller 152 and data processor 154 may be positioned either within enclosure 300, on an external surface of enclosure 300 or outside of enclosure 300 with electric connections, e.g. wired connections to the various components of AM device 100.

Some embodiments contemplate the fabrication of an object by dispensing different building material formulations from different printing heads. These embodiments provide, inter alia, the ability to select material formulations from a given number of building material formulations and define desired combinations of the selected material formulations and their properties. According to the present embodiments, the spatial locations of the deposition of each material formulation with the layer is defined, either to effect occupation of different three-dimensional spatial locations by different building material formulations, or to effect occupation of substantially the same three-dimensional location or adjacent three-dimensional locations by two or more different building material formulations so as to allow post deposition spatial combination of the building material formulations within the layer, thereby to form a composite material formulation at the respective location or locations.

Any post deposition combination or mix of modeling material formulations or modeling and support material formulations is contemplated. For example, once a certain material formulation is dispensed it may preserve its original properties. However, when it is dispensed simultaneously with another modeling material formulation or other dispensed material formulations which are dispensed at the same or nearby locations, a composite material formulation having a different property or properties to the dispensed material formulations is formed.

The present embodiments thus enable the deposition of a broad range of material formulation combinations, and the fabrication of an object which may consist of multiple different combinations of material formulations, in different parts of the object, according to the properties desired to characterize each part of the final 3D object.

Further details on the principles and operations of an AM device suitable for the present embodiments are found in U.S. Published Application Nos. 20100191360 and 20170173886, the contents of which are hereby incorporated by reference.

Figure 2:
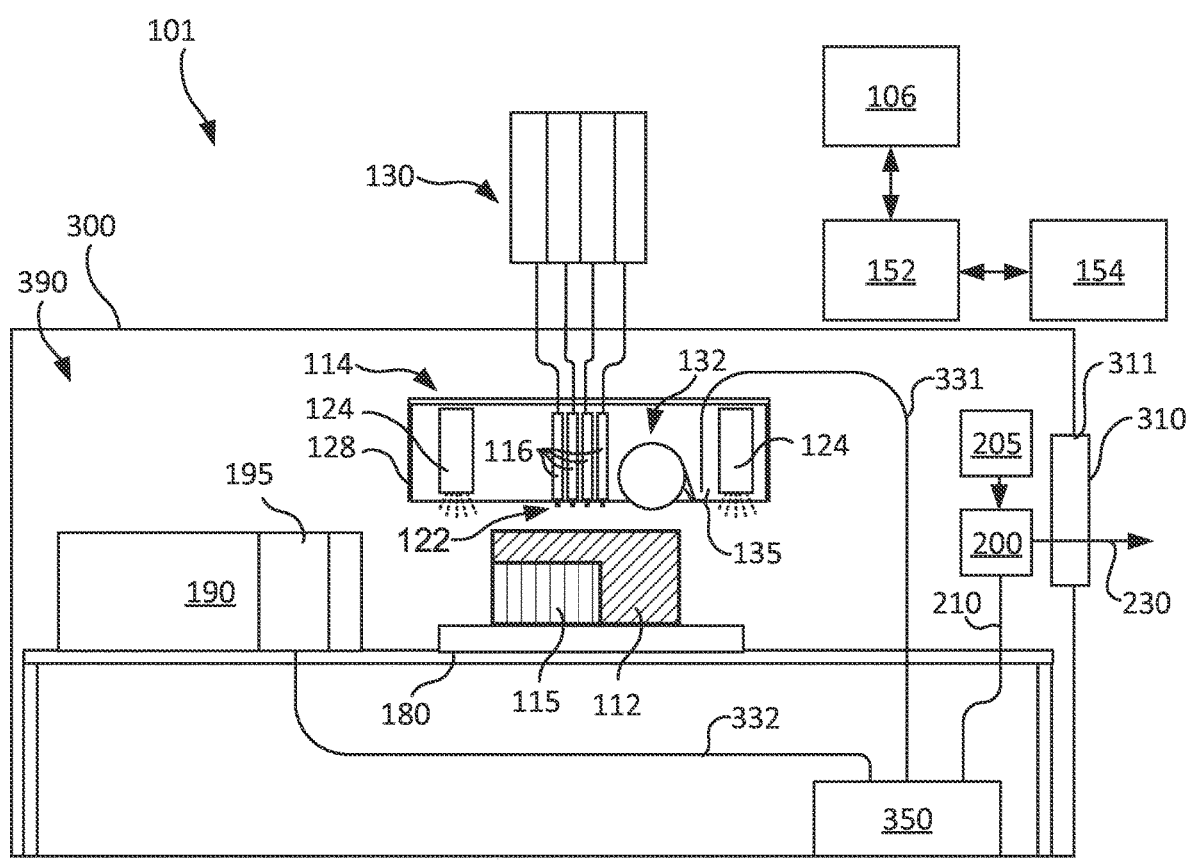
FIG. 2 is a simplified block diagram of an example AM device with a waste management system in accordance with some example embodiments.

Reference is now made to FIG. 2 a simplified block diagram of an example AM device with a waste management system in accordance with some example embodiments. According to some example embodiments, an AM device 101 includes a waste management system for collecting both airborne waste and other waste accumulated during operation of AM device 101. Optionally, the waste management system additionally includes waste treatment capability configured to neutralize active contaminants in the waste collected, prior to discarding the waste. According to some example embodiments, the waste management system includes waste container 350, an air cleaning device 200 configured to condense vaporized contaminants within enclosure 300 into a liquid state, a conduit 210 configured to channel the condensed contaminants to waste container 350 and one or more additional conduits configured to channel additional waste accumulated during operation of AM device 101, e.g., surplus building and support materials. The collected waste products in waste container 350 may be in a liquid state and may optionally include solid particles immersed in a liquid. Optionally, the additional conduits include a first conduit 332 configured to channel liquid waste from waste bath 195 of purging station 190 to waste container 350 and a second conduit 331 configured to channel waste accumulated by leveling device 132 to waste container 350. According to some example embodiments, the waste management system includes an air circulation pump 205 that is configured to actively direct air flow into air cleaning device 200 and thereby promote cleaning of air 390 in enclosure 300. According to some example embodiments, air cleaning device 200 is a cold trap filter.

In some example embodiments, air 230 cleaned with air cleaning device 200 may be expelled out of enclosure 300 through an outlet 311. Optionally, an additional air filter, e.g. a carbon filter installed in outlet 311 may be included in the waste management system. Optionally, air 230 expelled through outlet 311 is also filtered through filter 310. In some example embodiments, filter 310 is excluded. According to some example embodiments, waste may continuously or periodically flow into waste container 350 from one or more of conduits 331, 332 and 210 during operation of the AM device 101, e.g. during fabrication of an object with the AM device 101. Optionally, waste collected in waste container 350 is also treated as it is collected. Alternatively, waste treatment is performed in a post treatment process. According to some example embodiments, controller 152 is configured to control operation of the waste management system. Optionally, the waste management system is operated without user intervention.

Figure 3:
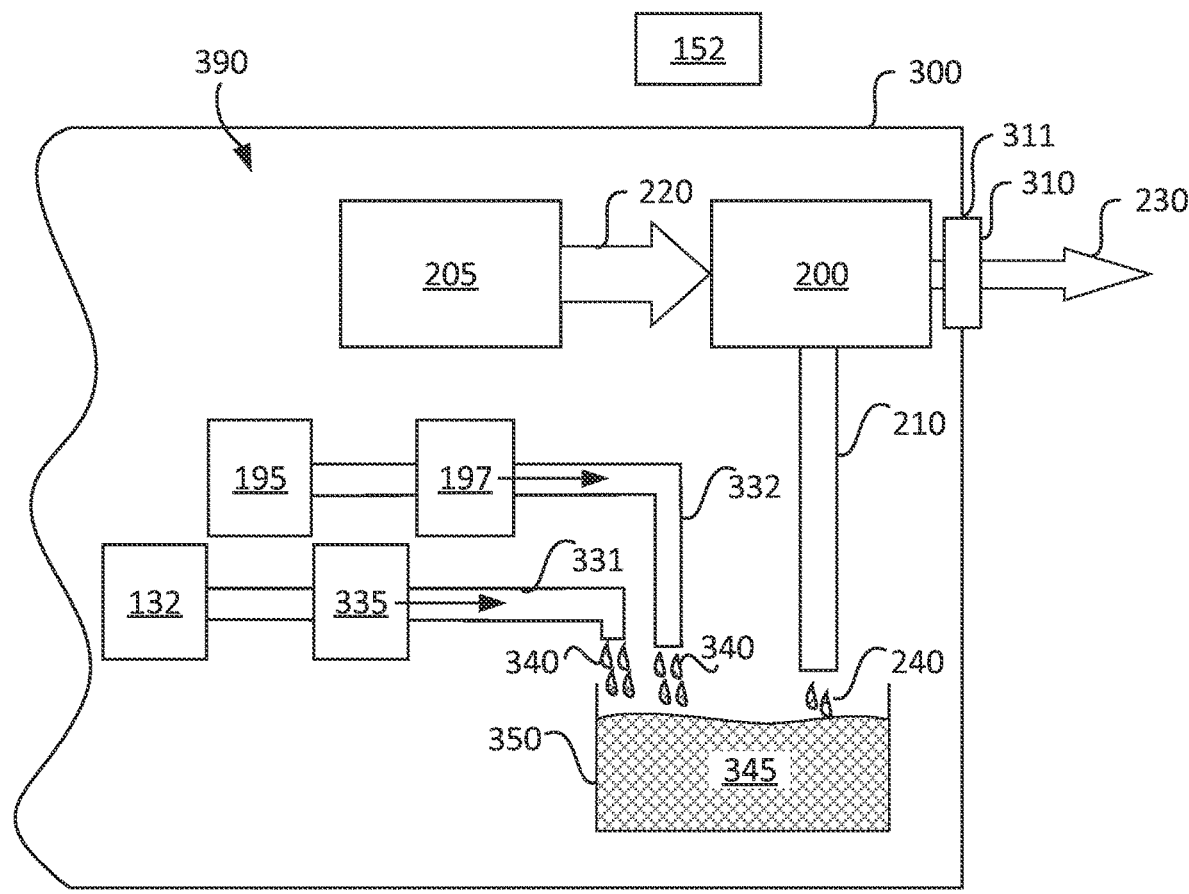
FIG. 3 is a simplified schematic drawing of a waste management system including an air cleaning device in accordance with some example embodiments.

Reference is now made to FIG. 3 showing a simplified schematic drawing of a waste management system including an air cleaning device in accordance with some example embodiments. According to some example embodiments, waste management system 390 includes waste container 350, air cleaning device 200 configured to condense vaporized contaminants in the surrounding air, conduit 210 configured to channel the condensed contaminants to waste container 350 and one or more additional conduits, e.g. conduits 331 and 332 configured to channel additional waste to waste container 350. According to some example embodiments, waste container 350 is within an enclosure 300 of an AM device and collects waste during operation of the AM device. According to some example embodiments, waste 345 collected in waste container 350 is a combination of waste 340 collected from components of the AM device and liquid condensation 240 collected from air cleaning device 200. According to some example embodiments, waste management system 390 additionally includes air circulation pump 205 to actively direct air 220 toward air cleaning device 200.

According to some example embodiments, liquid condensation 240 from air cleaning device 200 is directed through a dedicated conduit 210 to a waste container 350. Conduit 210 may be integral to air cleaning device 200 or may be a separate element that is connected to liquid outflow of air cleaning device 200 on one end and extends toward waste container 350 with an opening at an opposite end for expelling condensed liquid 240 into waste container 350.

According to some example embodiments, liquid condensation 240 includes vaporized contaminating resin components from building material dispensed during the AM process. In some example embodiments, waste container 350 is additionally configured to collect waste 340, e.g. surplus building materials (modeling and support materials) in liquid and/or at least partially solidified form from one or more of leveling device 132 and purging station 195. The waste material 340 may be building material, e.g. modeling materials and/or support materials that are removed from the layers being formed, with leveling device 132. Optionally, a pump 335 is configured to pump waste material 340 from trough 135 of leveling device 132 into waste container 350. According to some example embodiments, waste material 340 is a liquid, gel, semi-solid, solid and/or foam material. According to some example embodiments, condensed liquid 240 and waste material 340 are concurrently collected in waste container 350. Condensed liquid 240 may be formed from building material that vaporized during the building process. Optionally both condensed liquid 240 and waste material 340 include active volatile components including photoactive components.

Optionally, additional waste products may be collected into waste container 350, e.g. cleaning fluid used in purging station 190. In some example embodiments, waste management system 390 includes a pump 335 configured to pump waste from leveling device 132 to waste chamber 350. In some example embodiments, waste management system 390 includes a pump 197 configured to controllably pump waste from waste bath 195 in purging station 190 to waste chamber 350. Alternatively, a single pump may direct waste 340 from both leveling device 132 and waste bath 195.

Figure 4:
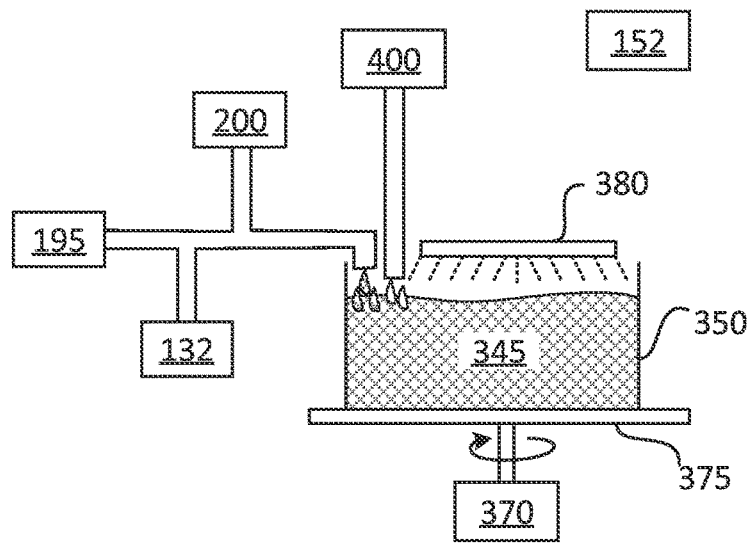
FIG. 4 is a simplified schematic drawing of an example waste management system with curing in accordance with some example embodiments.

Reference is now made to FIG. 4 showing a simplified schematic drawing of an example waste management system with curing in accordance with some example embodiments. According to some example embodiments, a waste management system includes a waste container 350 configured to receive waste 345 from different sources including liquid condensation from the surrounding air, and waste collected during operation of the AM device, a radiation source 380 configured to cure waste collected in waste container 350 and optionally a water source 400 including a pump configured to controllably dispense water into waste container 350. Waste material 345 may include waste from building material and/or air vapors in liquid form including photoactive components. The liquid waste material 345 may include some solid or at least partially solid particles immersed in liquid.

In some example embodiments, material deposited in waste container 350 is radiated with radiation source 380 configured to cure the waste material. Optionally, waste management system includes a rotatable platform 375 that rotates waste container 350 with a motor 370 while radiation source 380 radiates the contents of container 350. Optionally, water from water source 400 may be periodically dispensed on waste 345. In some example embodiments, covering waste 345 with a water may assist in fully curing waste 345. According to some example embodiments, controller 152 is configured to control operation of radiation source 380 as well as a pump associated with water source 400 and motor 370 when present. Optionally, flow of waste 345 into waste container 350 is selectively controlled to provide for proper curing and controller 152 is configured to control flow rate of flow into waste container 350.

Figure 5:
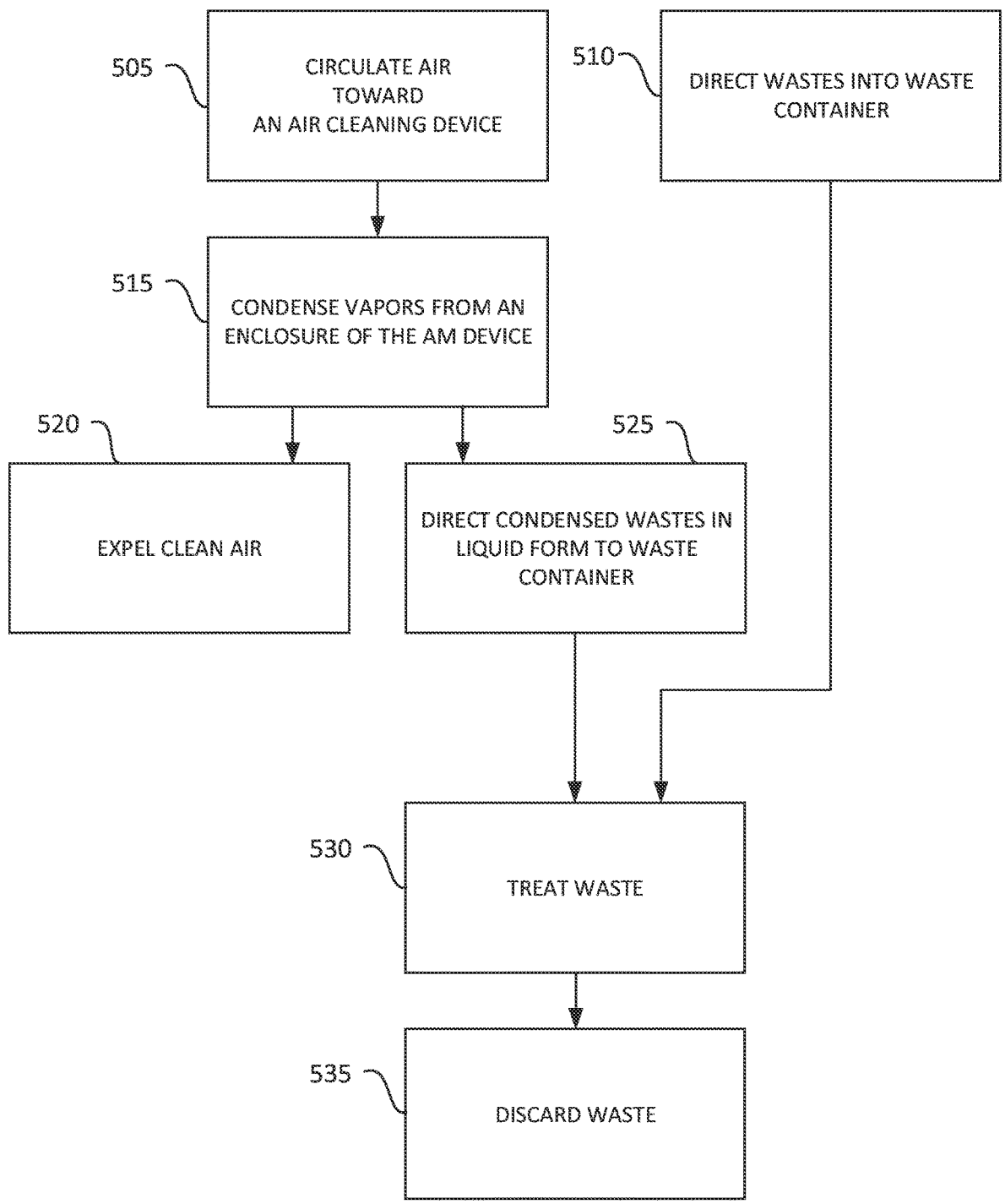
FIG. 5 is a simplified flow chart of an example method to manage waste accumulated in an AM process in accordance with some example embodiments.

Reference is now made to FIG. 5 showing a simplified flow chart of an example method to manage waste accumulated in an AM process in accordance with some example embodiments. According to some example embodiments, during operation of an AM device, air is circulated toward a filter configured to remove airborne wastes (block 505).

Optionally and preferably, the filter is a cold trap filter configured to condense vapors in the air within the AM device enclosure (block 515). The vapors may include active volatile components that are released in an internal space of the AM device during operation of the AM device. In some example embodiments, air that is filtered or cleaned based on the condensation is expelled from the AM device (block 520). Optionally, air expelled from the cold trap filter is further filtered through a carbon filter prior to being expelled from the enclosure of the AM device.

The active volatile components may be components released from the building materials during operation of the AM device. In some example embodiments, depositing the building materials at elevated temperature promotes vaporization of active volatile components in the building materials, and may lead to contamination of air in the AM device. In some example embodiments, the active volatile components may be monomers. In some example embodiments, the monomers are photopolymeric components. Optionally, the monomers include one or more of Acryloylmorpholine (ACMO) and Isobornyl acrylate (IBOA).

According to some example embodiments, the condensed vapors are directed to a waste container of the AM device (block 525). The waste container may be housed within the enclosure of the AM device or in a neighboring enclosure. According to some example embodiments, condensing airborne waste cleans the surrounding air from contaminants and reduces the need for filtering the air expelled from the enclosure of the AM device with carbon filters or the like and/or reduces a frequency in which the carbon air filters need to be cleaned or replaced.

According to some example embodiments, the same waste container is additionally and concurrently configured to collect waste accumulated during the AM process (block 510). The waste may be surplus building materials, optionally accumulated from one or more of a leveling device and a purging station included in the AM device. In some example embodiments, the liquid waste may include additional material other than building material such as cleaning fluid dispensed in the purging station, e.g. to clean nozzles of a printing head. Optionally, the waste may include solid components, e.g. at least partially solidified components, immersed in a liquid. In some example embodiments, the waste is actively pumped into the waste container. Alternatively, the waste is directed to a waste container without active pumping.

According to some example embodiments, the waste from each of the different sources, e.g. condensation of airborne waste as well as waste accumulated by the device are collected in the same waste container. In some example embodiments, the accumulated waste in the waste container from all the difference sources may be cured or otherwise treated for safe disposal of the waste. Optionally the accumulated waste is treated (block 530) to reduce the concentration of active volatile components, e.g. the monomers and/or the photopolymeric components. The waste may be treated during operation of the AM device and concurrently with waste accumulation from the different sources. Optionally, the waste treating includes curing the waste to reduce concentration of photopolymeric components in the waste material. In some example embodiments, based on the waste treatment, the waste in the waste container may be safely discarded as common trash (block 535).

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find calculated support in the following examples.

EXAMPLES

Reference is now made to the following examples, which together with the above descriptions illustrate some embodiments of the invention in a non-limiting fashion.

According to some example embodiments, the waste management system as described herein is configured to remove monomers that are vaporized in the air included within the enclosure of the AM device. For instance, the monomers may be volatile compounds originating from the jetted building material, e.g. modeling and support material. Examined monomers include ACMO and IBOA.

A boiling point of ACMO is 296.8° C. at 760 mmHg, and the saturated vapor pressure is 0.00141 mmHg at 25° C.

A boiling point of IBOA is 244.5° C. at 760 mmHg, and the saturated vapor is 0.0302 mmHg at 25° C.

The vapor pressure P at lower temperatures T may be calculated based on the following equation:

$$\log(P) = A + B/(T[° C.] + 273.15) \quad \text{Equation (1)}$$

where A, B are constants depending on material.
The results are tabulated in Table 1.

TABLE 1

| Decreased concentrations of ACMO and IBOA in air at low temperatures relative to 25° C. | | |
|---|---|---|
| | ACMO | IBOA |
| Cold trap at +1° C. | 10 | 8 |
| Cold trap at −17° C. | 100 | 50 |

Based on Table 1 it can be seen that use of the cold trap providing air cooling to +1° C. decreases ACMO and IBOA concentrations in air by about 10 and 8 times respectively comparative to non-cooled air, and cold trap with air cooling to −17° C. decreases ACMO and IBOA concentrations by about 100 and 50 times respectively comparative to non-cooled air. Optionally, the decrease in concentration provided at −17° C. may be sufficient to expel the cleaned air out of the AM device without additional filtering. Optionally, a robust industrial cold trap with lower temperature (e.g., cold trap CT-50G, −50° C. manufactured by OPERON) may provide even lower residual concentration of monomers in the air.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A waste management system for an additive manufacturing (AM) device, the system comprising:
   a waste container configured to store waste accumulated by the AM device during operation of the AM device;
   an air cleaning device installed within an enclosure of the AM device and configured to condense vapors formed within said enclosure of the AM device during operation of the AM device;
   a first conduit configured to direct the condensed vapors in a liquid state from the air cleaning device to the waste container; and
   at least one second conduit configured to direct liquid waste accumulated during operation of the AM device directly to the waste container.

2. The waste management system according to claim 1 comprising an air circulation pump configured to actively direct a flow of air within the enclosure of the AM device to the air cleaning device.

3. The waste management system according to claim 1, wherein the air cleaning device is a cold trap filter.

4. The waste management system according to claim 1, wherein the air cleaning device is configured to operate at a temperature from 5° C. to −60° C.

5. The waste management system according to claim 1, wherein the air cleaning device is configured to reduce a concentration of monomers in an air enclosed within the enclosure based on condensing the vapors.

6. The waste management system according to claim 1, wherein the air cleaning device includes an air outlet through which cleaned air is expelled and wherein the air outlet is configured to direct air through an outlet on the enclosure of the AM device.

7. The waste management system according to claim 6, comprising at least one carbon filter installed on the outlet in the enclosure of the AM device and wherein the clean air is configured to be expelled through the carbon filter.

8. The waste management system according to claim 1, comprising a waste treatment apparatus configured to neutralize active components in the waste contained in the waste container.

9. The waste management system according to claim 8 wherein the waste treatment apparatus includes a radiation source configured to radiate the waste and thereby neutralize photoactive components in the waste.

10. The waste management system according to claim 9, wherein the waste treatment apparatus includes:
    a rotatable platform configured to support the waste container; and
    a motor configured to rotate the platform.

11. The waste management system according to claim 8, wherein the waste treatment apparatus includes a water source configured to controllably direct water into the waste container.

12. The waste management system according to claim 1, comprising at least one pump configured to controllably pump waste from the at least one second conduit into the waste container.

13. The waste management system according to claim 1, wherein the at least one second conduit is configured to direct waste from a leveling device of the AM device to the waste container.

14. The waste management system according to claim 1, wherein the at least one second conduit is configured to direct waste from a purging station of the AM device to the waste container.

15. An Additive Manufacturing (AM) device comprising:
    a tray configured to receive building material;
    an inkjet printing block comprising:
    at least one printing head configured to selectively dispense building material on the tray in a layer-wise manner, wherein the selective dispensing defines an object to be built;
    a leveling device configured to remove surplus material from a layer dispensed with the at least one printing head; and
    a waste management system according to claim 1.

16. The AM device according to claim 15, comprising a purging station configured to perform maintenance operations on the at least one printing head, wherein the at least one second conduit of the waste management system is configured to direct waste from said purging station to the waste container.

* * * * *